US010779350B2

(12) United States Patent
Xia et al.

(10) Patent No.: US 10,779,350 B2
(45) Date of Patent: Sep. 15, 2020

(54) BEAM FAILURE RECOVERY REQUEST

(71) Applicant: Futurewei Technologies, Inc., Plano, TX (US)

(72) Inventors: Pengfei Xia, San Diego, CA (US); Young Hoon Kwon, San Diego, CA (US); Bin Liu, San Diego, CA (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 0 days.

(21) Appl. No.: 15/814,372

(22) Filed: Nov. 15, 2017

(65) Prior Publication Data

US 2019/0053294 A1    Feb. 14, 2019

Related U.S. Application Data

(60) Provisional application No. 62/543,765, filed on Aug. 10, 2017.

(51) Int. Cl.
| | | |
|---|---|---|
| *H04W 76/19* | (2018.01) | |
| *H04W 76/27* | (2018.01) | |
| *H04W 72/04* | (2009.01) | |
| *H04W 72/12* | (2009.01) | |
| *H04W 74/08* | (2009.01) | |
| *H04W 16/28* | (2009.01) | |

(52) U.S. Cl.
CPC ....... *H04W 76/19* (2018.02); *H04W 72/0413* (2013.01); *H04W 72/1289* (2013.01); *H04W 74/0833* (2013.01); *H04W 76/27* (2018.02); *H04W 16/28* (2013.01); *H04W 72/0433* (2013.01)

(58) Field of Classification Search
None
See application file for complete search history.

(56) References Cited

U.S. PATENT DOCUMENTS

| | | |
|---|---|---|
| 2007/0123263 A1 | 5/2007 | Smith et al. |
| 2013/0010723 A1 | 1/2013 | Ouchi |
| 2014/0010178 A1 | 1/2014 | Yu et al. |
| 2015/0024505 A1 | 1/2015 | Lynn et al. |
| 2015/0140999 A1 | 5/2015 | Zhang et al. |
| 2016/0150591 A1 | 5/2016 | Tarighat et al. |
| 2016/0183233 A1 | 6/2016 | Park |
| 2018/0110066 A1 | 4/2018 | Luo et al. |

(Continued)

FOREIGN PATENT DOCUMENTS

WO   2017024516 A1   2/2017

OTHER PUBLICATIONS

Office Action dated Nov. 1, 2018, in U.S. Appl. No. 15/815,658, 11 pages.

(Continued)

*Primary Examiner* — Chi H Pham
*Assistant Examiner* — Raul Rivas
(74) *Attorney, Agent, or Firm* — Vierra Magen Marcus LLP

(57) ABSTRACT

The disclosure relates to technology for beam failure recovery in user equipment, comprising detecting a beam failure event between the user equipment and a base station, sending a first beam failure recovery request (BFRQ) to the base station upon detection of the beam failure and searching for a beam failure recovery response (BFRP) within a first response window.

25 Claims, 10 Drawing Sheets

(56) References Cited

U.S. PATENT DOCUMENTS

| | | | |
|---|---|---|---|
| 2018/0138962 A1 | 5/2018 | Islam et al. | |
| 2018/0220448 A1 | 8/2018 | Akkarakaran et al. | |
| 2018/0278467 A1* | 9/2018 | John Wilson | H04B 7/0695 |
| 2018/0288756 A1 | 10/2018 | Xia et al. | |
| 2018/0302889 A1 | 10/2018 | Guo | |
| 2018/0368005 A1 | 12/2018 | Fukui et al. | |
| 2018/0368126 A1 | 12/2018 | Islam et al. | |
| 2018/0368142 A1 | 12/2018 | Liou | |
| 2019/0037604 A1 | 1/2019 | Akkarakaran et al. | |

OTHER PUBLICATIONS

International Search Report dated Oct. 24, 2018 in PCT Application No. PCT/CN2018/097786, 9 pages.
XP051272458 R1-1707245 Vivo,"Beam recovery based on NR-PDCCH and NR-PDSCH",3GPP TSG RAN WG1 Meeting #89,Hangzhou, P.R. China May 15-19, 2017,total 6 pages.
XP051300943 R2-1706437 MediaTek Inc.,"RLM/RLF and Beam Failure Recovery",3GPP TSG-RAN WG2 NR#2, Qingdao, China, Jun. 27-29, 2017,total 8 pages.
XP051299612 R1-1710400 Vivo,"Beam failure recovery procedure" 3GPP TSG RAN WG1 Meeting NR Ad-Hoc#2, Qingdao, P. R. China, Jun. 27-30, 2017,total 5 pages.
EP 18845028.2-1220—European Search Report dated Mar. 30, 2020, 11 pages.
Response to Office Action dated Feb. 25, 2019, in U.S. Appl. No. 15/815,658.
Notice of Allowance dated Mar. 26, 2019, in U.S. Appl. No. 15/796,449.
Notice of Allowance dated Jun. 18, 2019, in U.S. Appl. No. 15/815,658.
R1-1717813 CATT, "Consideration on beam failure recovery", 3GPP TSG RAN WG1 Meeting 90bis, Oct. 9-13, 2017 (Year: 2017).
R1-1717606 Samsung, "Beam failure recovery", 3GPP TSG RAN WG1 Meeting 90bis, Oct. 9-13, 2017 (Year: 2017).
R1-1717473 Vivo, "Discussion on beam failure recovery", 3GPP TSG RAN WG1 Meeting 90bis, Oct. 9-13, 2017 (Year: 2017).
R1-1717302 Huawei, "Beam failure recovery design details", 3GPP TSG RAN WG1 Meeting 90bis, Oct. 9-13, 2017 (Year 2017).

* cited by examiner

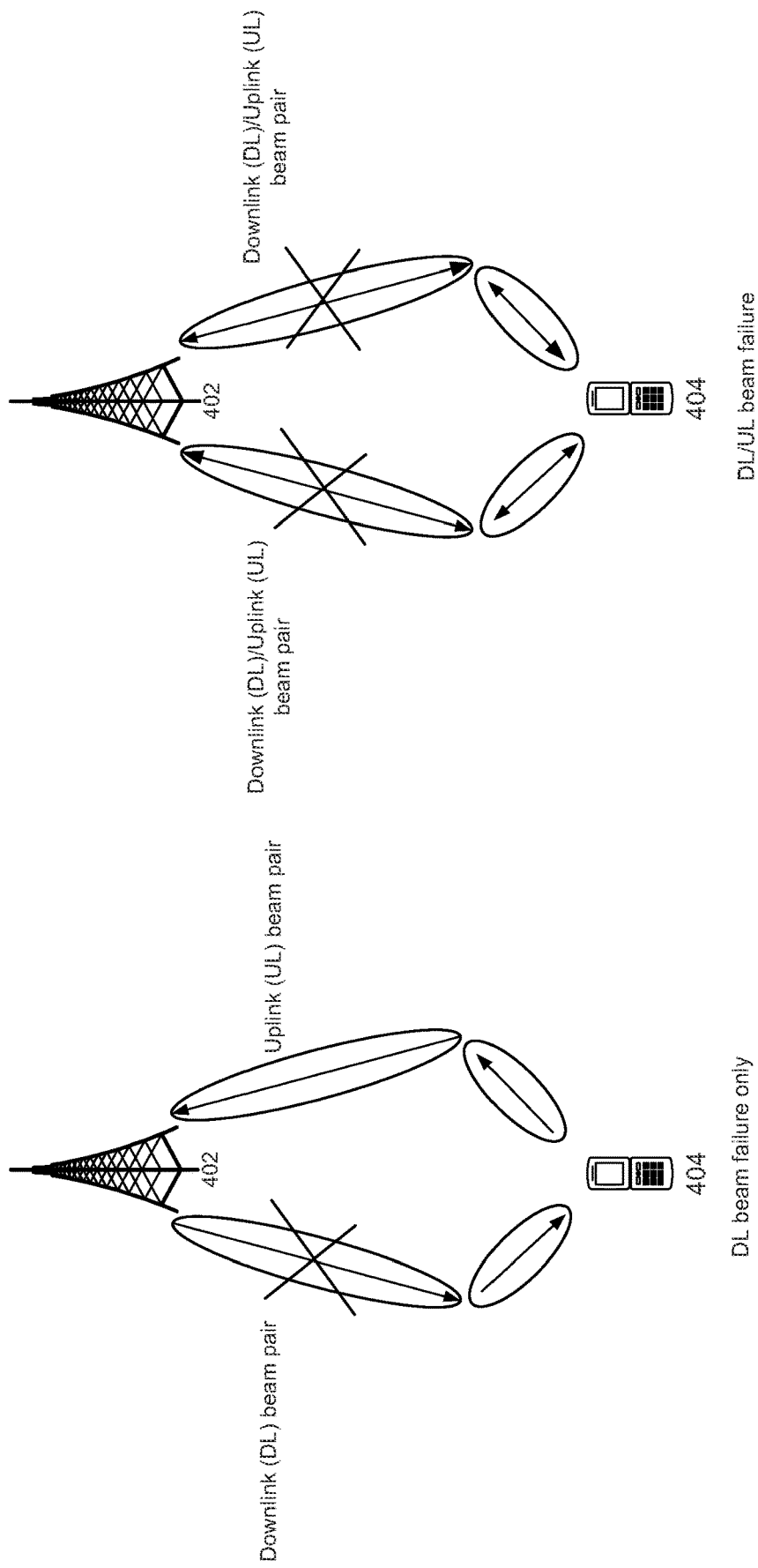

BEAM FAILURE RECOVERY REQUEST

CLAIM FOR PRIORITY

This application claims the benefit of priority to U.S. Provisional Application No. 62/543,765, filed Aug. 10, 2017, the entire contents of which are hereby incorporated by reference.

FIELD

The disclosure generally relates to wireless communication networks, and in particular, to recovering from a beam failure between user equipment and a base station.

BACKGROUND

As the demand for capacity in mobile broadband communications increases drastically every year, wireless communication systems are increasing their capability of handling mobile traffic. In next generation systems, such as fifth generation (5G) technologies, advanced communications, such as millimeter-wave (mm-wave) communications, with potential multigigabit-per-second data rates are candidate technologies to increase overall capacity and transmission speeds. Highly directional beamforming antennas are necessary at both the base station (BS) and mobile station (MS) to compensate for the high attenuation in the mm-wave frequency band and to extend its transmission range.

A misalignment between transmitting (TX) and receiving (RX) beams may cause a significant loss in the received power, especially for systems with narrow beams, and result in beam failure. To avoid such beam failure, beam alignment in mm-wave communication systems is necessary to find the best beam pair from all possible beam pairs for maximum beamforming efficiency. However, when a beam failure occurs, a reporting and recovery mechanism is employed to report and recover from the failure. During the 3GPP TSG RAN WG1 #89, it was agreed upon to support a non-contention based channel based on the Physical Random Access Channel (PRACH) and the Physical Uplink Control Channel (PUCCH) for beam failure recovery request transmission. PRACH denotes a Long Term Evolution (LTE) uplink channel transmitted by a terminal so as to establish initial synchronization, whereas PUCCH denotes an LTE uplink control channel, and includes Channel Quality Indicator (CQI) information.

BRIEF SUMMARY

According to one aspect of the present disclosure, there is a method for beam failure recovery in user equipment, including detecting a beam failure event between the user equipment and a base station; sending a first beam failure recovery request (BFRQ) to the base station upon detection of the beam failure event; and searching for a beam failure recovery response (BFRP) within a first response window.

Optionally, in any of the preceding aspects, sending the BFRQ is carried out in the physical layer of the user equipment.

Optionally, in any of the preceding aspects, the first BFRQ is sent using one of a physical uplink channel (PUCCH) or a random access channel for beam failure recovery (PRACH).

Optionally, in any of the preceding aspects, the first response time window is a PUCCH response window when the BFRQ is sent using the PUCCH, or the first response time window is a beam failure random access channel response window when the BFRQ is sent using the random access channel for beam failure recovery (PRACH).

Optionally, in any of the preceding aspects, a parameter of the first response time window is at least one of a response window starting position in time, a response window ending position in time or a response window duration in time.

Optionally, in any of the preceding aspects, a configuration of the response time window is signaled to the user equipment in at least one of a radio resource control (RRC) message or a downlink control information (DCI) message.

Optionally, in any of the preceding aspects, the first BFRQ is sent using the PUCCH when a PUCCH-BFRQ opportunity arrives before a PRACH-BFRQ opportunity.

Optionally, in any of the preceding aspects, the first BFRQ is sent using the PUCCH when a PUCCH-BFRQ opportunity arrives after a PRACH-BFRQ opportunity.

Optionally, in any of the preceding aspects, the PUCCH-BFRQ arrives at a first time and the PRACH-BFRQ arrives at a second time, and the PUCCH-BFRQ is sent at the first time when a PUCCH-BFRQ opportunity response is expected before a PRACH-BFRQ opportunity at the second time, unless a sum of the first time and a response time exceeds the second time.

Optionally, in any of the preceding aspects, the method further includes sending a second BFRQ to the base station for a same beam failure event; and indicating to the base station that the first and second BFRQs correspond to the same beam failure event.

Optionally, in any of the preceding aspects, the indicating includes one of marking the second BFRQ as secondary in time or order, placing a pointer to the first BFRQ in the second BFRQ indicating that the first and second BFRQs correspond to the same beam failure event, and placing a beam failure event ID in the first BFRQ and the second BFRQ with the same beam failure event ID.

Optionally, in any of the preceding aspects, the method further includes receiving first and second beam failure recovery responses (BFRPs) from the base station, wherein the BFRP includes one of a mark in the second BFRP as secondary as secondary in time or order, a pointer in the second BFRP to the first BFRP indicating that the first and second BFRPs correspond to the same beam failure event, and a beam failure event ID in the first and second BFRPs with the same beam failure event ID.

Optionally, in any of the preceding aspects, the second BFRQ is on a different channel or carrier frequency than the first BFRQ.

According to another embodiment of the present disclosure, there is a device for beam failure recovery in user equipment, including a non-transitory memory storage comprising instructions; and one or more processors in communication with the memory, wherein the one or more processors execute the instructions to detect a beam failure event between the user equipment and a base station; send a first beam failure recovery request (BFRQ) to the base station upon detection of the beam failure event; and search for a beam failure recovery response (BFRP) within a first response window.

According to still another aspect of the present disclosure, there is a non-transitory computer-readable medium storing computer instructions for beam failure recovery in user equipment, that when executed by one or more processors, cause the one or more processors to perform the operations of detecting a beam failure event between the user equipment and a base station; sending a first beam failure recovery request (BFRQ) to the base station upon detection of the beam failure event; and searching for a beam failure recovery response (BFRP) within a first response window.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate elements.

FIGS. 4A and 4B illustrate examples of beam failure between a base station and user equipment.

DETAILED DESCRIPTION

The disclosure relates to technology for recovering from a beam failure between user equipment and a base station.

User equipment and base stations establish a connections using downlink and uplink beam pairs. Often times, for example as a result of blockage or user equipment rotation or displacement, the connection between the user equipment and the base station is disrupted, resulting in a beam failure. To overcome such failure, a beam failure recovery mechanism may help to improve high frequency link performance. In particular, a beam failure recovery request (BFRQ) and response (BFRQ) method based on a PRACH-like channel and PUCCH is disclosed. The disclosed mechanism determines whether the BFRQ should be sent using the PRACH-like channel or the PUCCH, depending on the expected BFRQ.

It is understood that the present embodiments of the disclosure may be implemented in many different forms and that claims scopes should not be construed as being limited to the embodiments set forth herein. Rather, these embodiments are provided so that this disclosure will be thorough and complete and will fully convey the inventive embodiment concepts to those skilled in the art. Indeed, the disclosure is intended to cover alternatives, modifications and equivalents of these embodiments, which are included within the scope and spirit of the disclosure as defined by the appended claims. Furthermore, in the following detailed description of the present embodiments of the disclosure, numerous specific details are set forth in order to provide a thorough understanding. However, it will be clear to those of ordinary skill in the art that the present embodiments of the disclosure may be practiced without such specific details.

Figure 1:
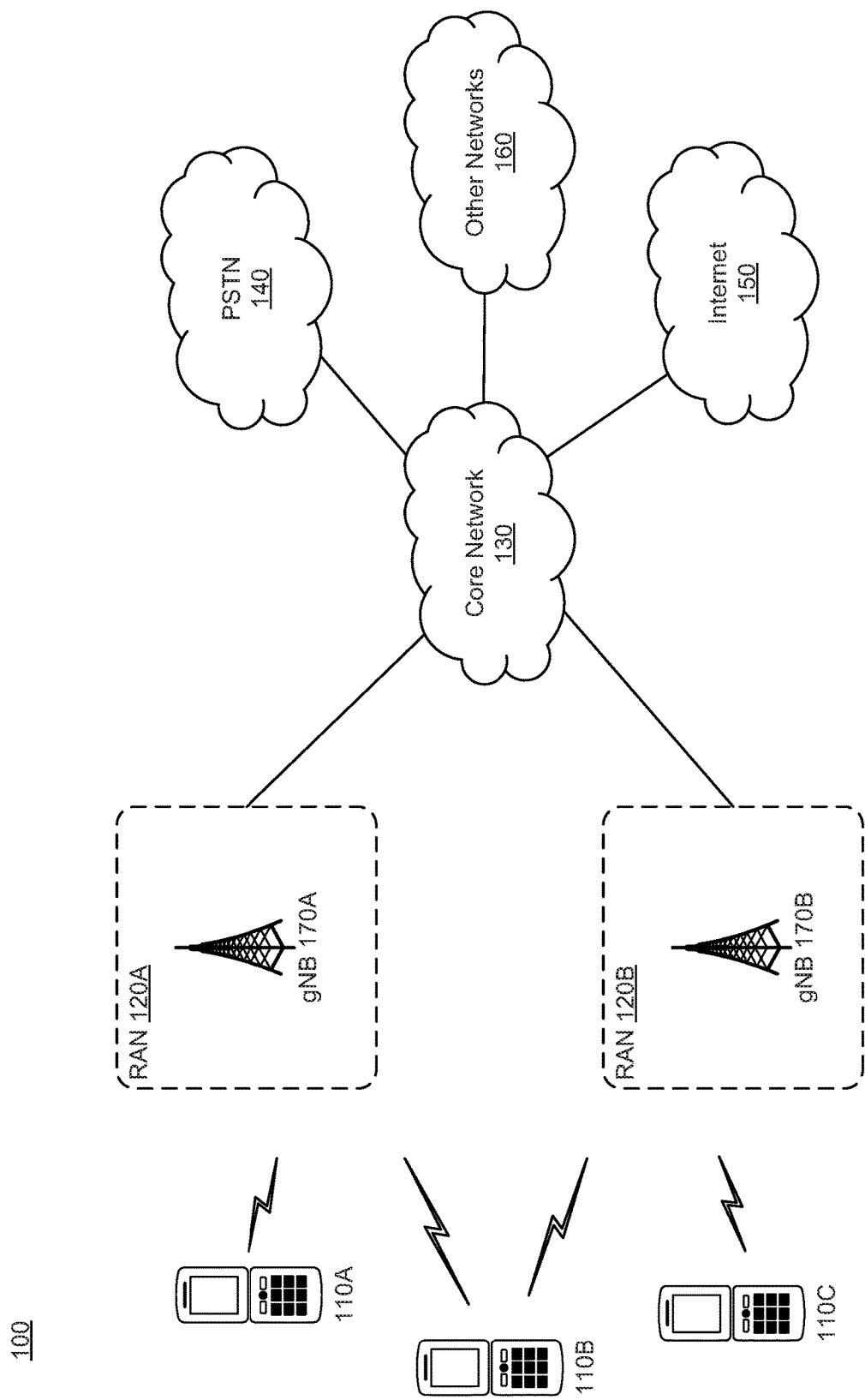
FIG. 1 illustrates a wireless network for communicating data.

FIG. 1 illustrates a wireless network for communicating data. The communication system 100 includes, for example, user equipment 110A-110C, radio access networks (RANs) 120A-120B, a core network 130, a public switched telephone network (PSTN) 140, the Internet 150, and other networks 160. Additional or alternative networks include private and public data-packet networks including corporate intranets. While certain numbers of these components or elements are shown in the figure, any number of these components or elements may be included in the system 100.

In one embodiment, the wireless network may be a fifth generation (5G) network including at least one 5G base station which employs orthogonal frequency-division multiplexing (OFDM) and/or non-OFDM and a transmission time interval (TTI) shorter than 1 ms (e.g. 100 or 200 microseconds), to communicate with the communication devices. In general, a base station may also be used to refer any of the eNB and the 5G BS (gNB). In addition, the network may further include a network server for processing information received from the communication devices via the at least one eNB or gNB.

System 100 enables multiple wireless users to transmit and receive data and other content. The system 100 may implement one or more channel access methods, such as but not limited to code division multiple access (CDMA), time division multiple access (TDMA), frequency division multiple access (FDMA), orthogonal FDMA (OFDMA), or single-carrier FDMA (SC-FDMA).

The user equipment (UE) 110A-110C are configured to operate and/or communicate in the system 100. For example, the user equipment 110A-110C are configured to transmit and/or receive wireless signals or wired signals. Each user equipment 110A-110C represents any suitable end user device and may include such devices (or may be referred to) as a user equipment/device, wireless transmit/receive unit (WTRU), mobile station, fixed or mobile subscriber unit, pager, cellular telephone, personal digital assistant (PDA), smartphone, laptop, computer, touchpad, wireless sensor, or consumer electronics device.

In the depicted embodiment, the RANs 120A-120B include one or more base stations 170A, 170B (collectively, base stations 170), respectively. Each of the base stations 170 is configured to wirelessly interface with one or more of the UEs 110A, 110B, 110C to enable access to the core network 130, the PSTN 140, the Internet 150, and/or the other networks 160. For example, the base stations (BSs) 170 may include one or more of several well-known devices, such as a base transceiver station (BTS), a Node-B (NodeB), an evolved NodeB (eNB), a next (fifth) generation (5G) NodeB (gNB), a Home NodeB, a Home eNodeB, a site controller, an access point (AP), or a wireless router, or a server, router, switch, or other processing entity with a wired or wireless network.

In one embodiment, the base station 170A forms part of the RAN 120A, which may include other base stations, elements, and/or devices. Similarly, the base station 170B forms part of the RAN 120B, which may include other base stations, elements, and/or devices. Each of the base stations 170 operates to transmit and/or receive wireless signals within a particular geographic region or area, sometimes referred to as a "cell." In some embodiments, multiple-input multiple-output (MIMO) technology may be employed having multiple transceivers for each cell.

The base stations 170 communicate with one or more of the user equipment 110A-110C over one or more air interfaces (not shown) using wireless communication links. The air interfaces may utilize any suitable radio access technology.

It is contemplated that the system 100 may use multiple channel access functionality, including for example schemes in which the base stations 170 and user equipment 110A-110C are configured to implement the Long Term Evolution wireless communication standard (LTE), LTE Advanced (LTE-A), and/or LTE Broadcast (LTE-B).

In other embodiments, the base stations 170 and user equipment 110A-110C are configured to implement UMTS, HSPA, or HSPA+ standards and protocols. Of course, other multiple access schemes and wireless protocols may be utilized.

The RANs 120A-120B are in communication with the core network 130 to provide the user equipment 110A-110C with voice, data, application, Voice over Internet Protocol (VoIP), or other services. As appreciated, the RANs 120A-120B and/or the core network 130 may be in direct or indirect communication with one or more other RANs (not shown). The core network 130 may also serve as a gateway access for other networks (such as PSTN 140, Internet 150, and other networks 160). In addition, some or all of the user equipment 110A-110C may include functionality for communicating with different wireless networks over different wireless links using different wireless technologies and/or protocols.

The RANs 120A-120B may also include millimeter and/or microwave access points (APs). The APs may be part of the base stations 170 or may be located remote from the base stations 170. The APs may include, but are not limited to, a connection point (a mmW CP) or a base station 170 capable of mmW communication (e.g., a mmW base station). The mmW APs may transmit and receive signals in a frequency range, for example, from 6 GHz to 100 GHz, but are not required to operate throughout this range. As used herein, the term base station is used to refer to a base station and/or a wireless access point.

Although FIG. 1 illustrates one example of a communication system, various changes may be made to FIG. 1. For example, the communication system 100 could include any number of user equipment, base stations, networks, or other components in any suitable configuration. It is also appreciated that the term user equipment may refer to any type of wireless device communicating with a radio network node in a cellular or mobile communication system. Non-limiting examples of user equipment are a target device, device-to-device (D2D) user equipment, machine type user equipment or user equipment capable of machine-to-machine (M2M) communication, laptops, PDA, iPad, Tablet, mobile terminals, smart phones, laptop embedded equipped (LEE), laptop mounted equipment (LME) and USB dongles.

Figure 2:
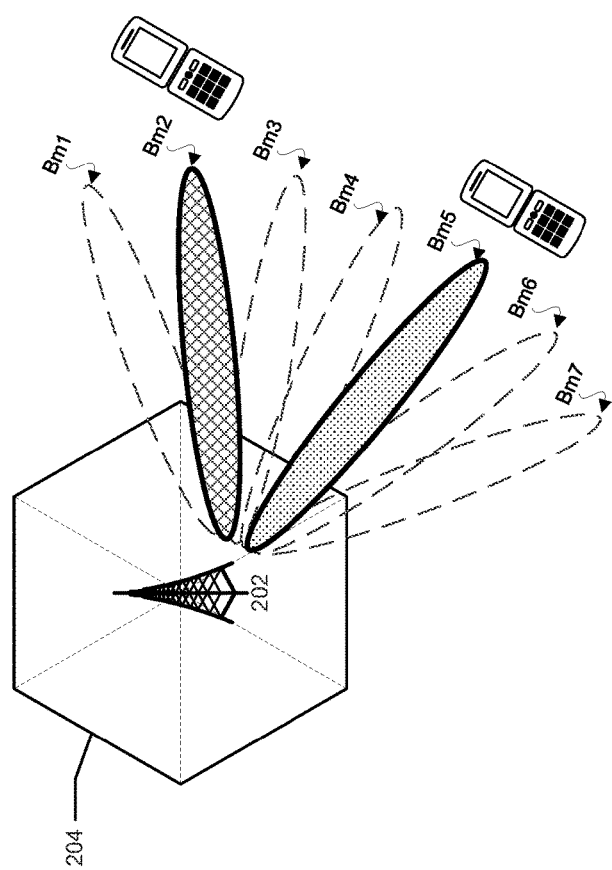
FIG. 2 illustrates a base station with transmitting and receiving beams according to an example embodiment

FIG. 2 illustrates a base station with transmitting and receiving beams according to an example embodiment. The base station 202 manages a cell 204 divided into one or more sectors as its service coverage area and forms multiple transmit/receive (Tx/Rx) beams BM1-BM7 using beamforming schemes. Beamforming generally refers to use of multiple antennas to control the direction of a wavefront by appropriately weighting the magnitude and phase of individual antenna signals. Beamforming schemes includes, but are not limited to, digital beamforming (e.g., Transmit (Tx) pre-Inverse Fast Fourier Transform (pre-IFFT) beamforming/Receive (Rx) post-Fast Fourier Transform (post-FFT) beamforming), analog beamforming (e.g., Tx post-IFFT beamforming/Rx pre-FFT beamforming), or a combination thereof. The base station 202 transmits the beamformed signals by sweeping them simultaneously or successively, for example, beginning with beam BM1 and ending with BM7.

User equipment (UE), such as user equipment 110A-110C (FIG. 1), located within the cell of the base station 202 may be configured to receive signals omni-directionally without supporting Rx beamforming, receive signals while supporting Rx beamforming by using one beamforming pattern each time, or receive signals while supporting Rx beamforming by simultaneously using a plurality of beamforming patterns in different directions.

If the user equipment 110A-110C does not support Rx beamforming, the user equipment 110A-110C measures the channel quality of a reference signal (RS) in each transmission beam and reports the measurements to the base station 202. The station 202 selects the best beam for the user equipment 110A-110C from among a plurality of Tx beams. If the user equipment 110A-110C is configured to support Rx beamforming, the user equipment 110A-110C measures the channel qualities of multiple Tx beams received from the base station 202 for each reception beam pattern and reports a total or some high-ranked measurements of all Tx-Rx beam pairs to the base station 202. The base station 202 may allocate an appropriate Tx beam to the user equipment 110A-110C. If the user equipment 110A-110C is capable of receiving a plurality of Tx beams from the base station 202 or supporting a plurality of base station Tx-user equipment Rx beam pairs, the base station 202 may select a beam, taking into account diversity transmission through repeated transmission or simultaneous transmission.

Figure 3:
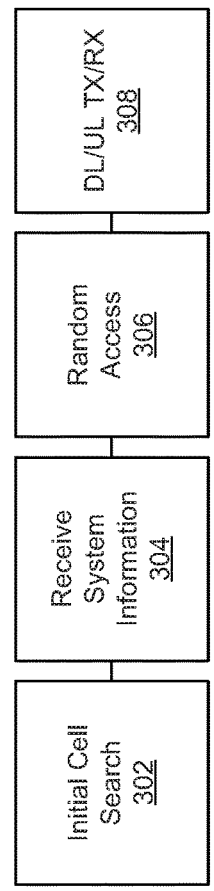
FIG. 3 illustrates physical channels and transmitting signals on the physical channels in accordance with FIG. 2.

FIG. 3 illustrates physical channels and transmitting signals on the physical channels in accordance with FIG. 2. When user equipment 110A-110C (FIG. 1) is powered on or enters a new cell, such as cell 204 (FIG. 2), the user equipment performs an initial cell search 302. The initial cell search 302 involves acquisition of synchronization to a base station, such as gNB 202. Specifically, the user equipment synchronizes its timing to the gNB 202 and acquires a cell Identifier (ID) and other information by receiving a Primary Synchronization Channel (P-SCH) and a Secondary Synchronization Channel (S-SCH) from the gNB 202. Subsequently, the user equipment 110A-110C may acquire information broadcast in the cell by receiving a Physical Broadcast Channel (PBCH) from the gNB 202. During the initial cell search, the user equipment 110A 110C may monitor a downlink (DL) channel state by receiving a do unlink reference Signal (DL RS).

After the initial cell search, the user equipment 110A-110C may acquire detailed system information at 304 by receiving a Physical Downlink Control Channel (PDCCH) and receiving a Physical Downlink Shared Channel (PDSCH) based on information included in the PDCCH.

If the user equipment 110A-110C initially accesses the gNB 202 or has no radio resources for signal transmission to the gNB 202, the user equipment 110A-110C may perform a random access procedure at 306 with the gNB 202. During the random access procedure 306, Upon completion of the above process, the user equipment 110A-110C may receive a PDCCH and/or a PDSCH from the gNB 202 and transmit a Physical Uplink Shared Channel (PUSCH) and/or a PUCCH to the gNB 202, which is a general DL and UL signal transmission procedure at 308. Specifically; the user equipment 110A-110C receives Downlink Control Information (DCI) on a PDCCH. The DCI includes, for example, control information such as resource allocation information for the user equipment 110A-110C.

Control information that the user equipment 110A-110C transmits to the gNB 202 on the uplink (UL) channel or receives from the gNB 202 on the DL channel includes a DL/UL ACKnowledgment/Negative ACKnowledgment (ACK/NACK) signal, a Channel Quality Indicator (CCM; a Precoding Matrix Index (PMI), a Rank Indicator (RI); etc. The control information, such as a CQI, a PMI, an RI, etc., may be transmitted on a PUSCH and/or a PUCCH.

FIGS. 4A and 4B illustrate examples of beam failure between a base station and user equipment. As illustrated, base station 402 is in communication with user equipment 404, in which the base station 402 and user equipment 404 communicate via DL beam pairs and UL beam pairs. In one embodiment, the DL beam pair fails (FIG. 4A). In another embodiment, the DL/UL beam pair fails (FIG. 4B).

Before establishing a communication or beam pair link with a base station 402, user equipment 404 generally performs cell acquisition and synchronization. The cell acquisition step typically involves receiving a synchronization signal from base station 402. In a high frequency wave band, beamforming may be applied to synchronization signals (otherwise, the distance at which the synchronization signal can be received is much smaller than the distance at which the beamformed data channels can be received). If the synchronization signals are beamformed, only user equipment 404 within the narrow angle covered by the beam are able to receive the synchronization signal. To ensure that user equipment 404 receives the synchronization signal, the base station 402 may "beam-sweep" the synchronization signal having the narrow angle covered by the beam. Beam sweeping refers to rotating the direction of the beam to cover all directions such that it may be detected in areas of the beam sweep by the user equipment 404. To receive the synchronization signal, the user equipment 404 may also need to rotate the direction in which it searches for the synchronization signal. Rotation allows the antennas (which may be phase-arrayed) of the base station 402 and user equipment 404 to be mutually aligned.

The cell acquisition and synchronization becomes even more complicated if the user equipment 404 is moving, as the direction of arrival of the synchronization signal beam continually changes. Under these circumstances, the user equipment 404 may try to locate multiple base stations 402 to identify multiple cells suitable for service. However, sweeping procedures to identify a group of base stations can mean a substantial increase in the cell acquisition duration.

At higher frequencies (e.g., microwave and millimeter-wave spectrum), beamformed transmissions are an important feature to overcome higher path losses. Beamforming may be applied to user equipment specific DL and UL data transmissions, and also to common channels such as synchronization and control channels on the DL and random access channels on the UL.

Since the antenna arrangements (FIG. 4C) at the base station 402 and at the user equipment 404 allow beamforming, there may be multiple beams in multiple directions for transmission and reception at each of the base stations 402 and the user equipment 404. For example, there may be any number of beam directions for reception at the user equipment 404 and any number of directions for beam transmission at the base station 402.

In the embodiment of FIG. 4A, a single or unidirectional transmission and reception beam pair are illustrated, whereas in FIG. 4B, multiple directions or omnidirectional transmission and reception beam pairs are illustrated. In either case, the system may determine the "best" beam pair(s) (e.g., the beam with the strongest signal, fastest DL/UL speed, etc.) for transmission and reception among the various reception and transmission directions. In this regard, a signal received from the base station 402 from a particular receive direction can be identified as having a corresponding transmit direction to transmit to the base station 402.

Beam pair transmission and reception (in the DL and UL beams) use multiple access technologies—orthogonal frequency division multiple access (OFDMA) for the DL, and single-carrier frequency division multiple access (SC-FDMA) for the UL. Dedicated data channels are not used in next generation systems, such as LTE and 5G. Instead shared transport channel resources are used in both the DL and the UL communications between the base station 402 and the user equipment 404. These shared transport channels DL-SCH and UL-SCH are respectively mapped to the physical downlink shared channel (PDSCH) on the DL OFDM subframe and physical uplink shared channel (PUSCH) on the UL SC-FDMA subframe.

The OFDM and the SC-FDMA subframes respectively include the physical downlink control channel (PDCCH) and physical uplink control channel (PUCCH). The PDCCH is used to convey user equipment-specific DL control information (DCI) from the base station 402 to the user equipment 404. Similarly, the PUCCH is used to carry UL control information (UCI) from the user equipment 404 to the base station 402, such as channel quality indication (CQI) reports, ACK/NACK responses and scheduling requests (SR).

At some point after establishing a communication or beam pair link (BPL), one of the beam pairs may fail (beam failure is represented in the diagrams by the "X" across a respective beam). Beam failure, as explained herein, may be the result of many factors, such as antenna misalignment, signal strength, etc. As illustrated in the embodiment of FIG. 4A, the DL beam has faded and the UL beam remains active. In the embodiment of FIG. 4B both the DL and UL beams fail.

In order for the system to recover from such a beam failure, the user equipment (UE) 404 sends a beam failure recovery request (BFRQ) to the base station (gNB) 402. In one embodiment, when only the DL beam has failed (FIG. 4A), the user equipment 404 may use the active PUCCH (originally allocated for UCI) to report the beam failure and request recovery from the base station 402, as agreed upon during the 3GPP TSG RAN WG1 #89 meeting. In another embodiment, when the DL and UL beams have faded, the user equipment 404 may also attempt to use the PUCCH for BFRQ. Beam failure recovery in this instance is less likely to be successful since both the UL and DL beams have failed. In either case, the BFRQ sent by the user equipment 404 requires a response message (BFRQ response) from the base station 402 if beam failure is to be recovered. However, the user equipment 404 does not know which DL beam will be used by the base station 402 to transmit a BFRQ response. The term beam failure recovery may bear other names, such as beam/link failure-recovery/reconfiguration. Additionally, in one embodiment, the BFRQ operation is generally carried out by the physical layer functions of the user equipment 404, where the physical layer operation is typically instructed by higher layer functions of the user equipment 404.

In order for the base station 402 to send a BFRQ response, the user equipment 404 first determines which candidate beam(s) may be used by the base station 402 to send a response. A candidate beam is understood to be any beam being transmitted/received by the user equipment 404 and base station 402, except for the failing beam (the beam that was detected as failing). In one embodiment, the candidate beam is determined based on the received signal strength or power.

To determine the candidate beam, the user equipment 402 uses the spatial quasi co-located (SQCL'ed) information between the base station 402 transmission (DL) and receive (UL) beams. Two antenna ports may be said to be SQCL'ed if large-scale properties of a radio channel over which a symbol on one antenna port is conveyed can be inferred from a radio channel over which a symbol on the other antenna port is conveyed. The large-scale properties may include, for example, delay spread, Doppler spread, Doppler shift, average gain, and average delay.

In one embodiment, the UE will monitor the base station 402 DL beam(s) SQCL'ed with the base station 402 UL receive beam for BFRQ reception. Specifically, the user equipment 404 monitors the PDCCH region of a DL beam with the assumption that the corresponding PDCCH demodulation reference signal (DMRS) is SQCL'ed with the RS of the identified candidate beam(s) by the user equipment 404. To make this determination, the user equipment 404 may (1) be provided with the SQCL'ed information between the active DL/UL beam pairs directly from the base station 402, or (2) utilize beam correspondence information between the DL and UL beam pairs. Beam correspondence refers to the reciprocity between UL and DL beams. For example, if a base station 402 or user equipment 404 is able to determine the TX beam to use based on the Rx beam, then it may be said to have beam correspondence.

In the case where the beam correspondence information is not readily available (e.g., in a multi-beam architecture for millimeter or microwave operation), the SQCL'ed information may be conveyed directly from the base station 402 in beam configuration signaling, such as Radio Resource Control (RRC), Medium Access Control (MAC)-Control Element (CE) or DL control information (DCI).

In the case where the beam correspondence is available, the user equipment 404 may determine the SQCL'ed status for the active beam pairs. For example, when beam correspondence information is available in the base station 402, the user equipment TX beam is indicated by the base station 402 CSI-RS resource indicator, thereby enabling the user equipment to determine the SQCL'ed DL beam pair and UL beam pair.

Although not the subject of this disclosure, in one embodiment, if no SQCL'ed DL beam pair is available for the UL beam pair that was in use prior to beam failure, the user equipment 404 may employ a PRACH-like (e.g., different parameters for preamble sequences from PRACH) BFRQ scheme.

Figure 4C:
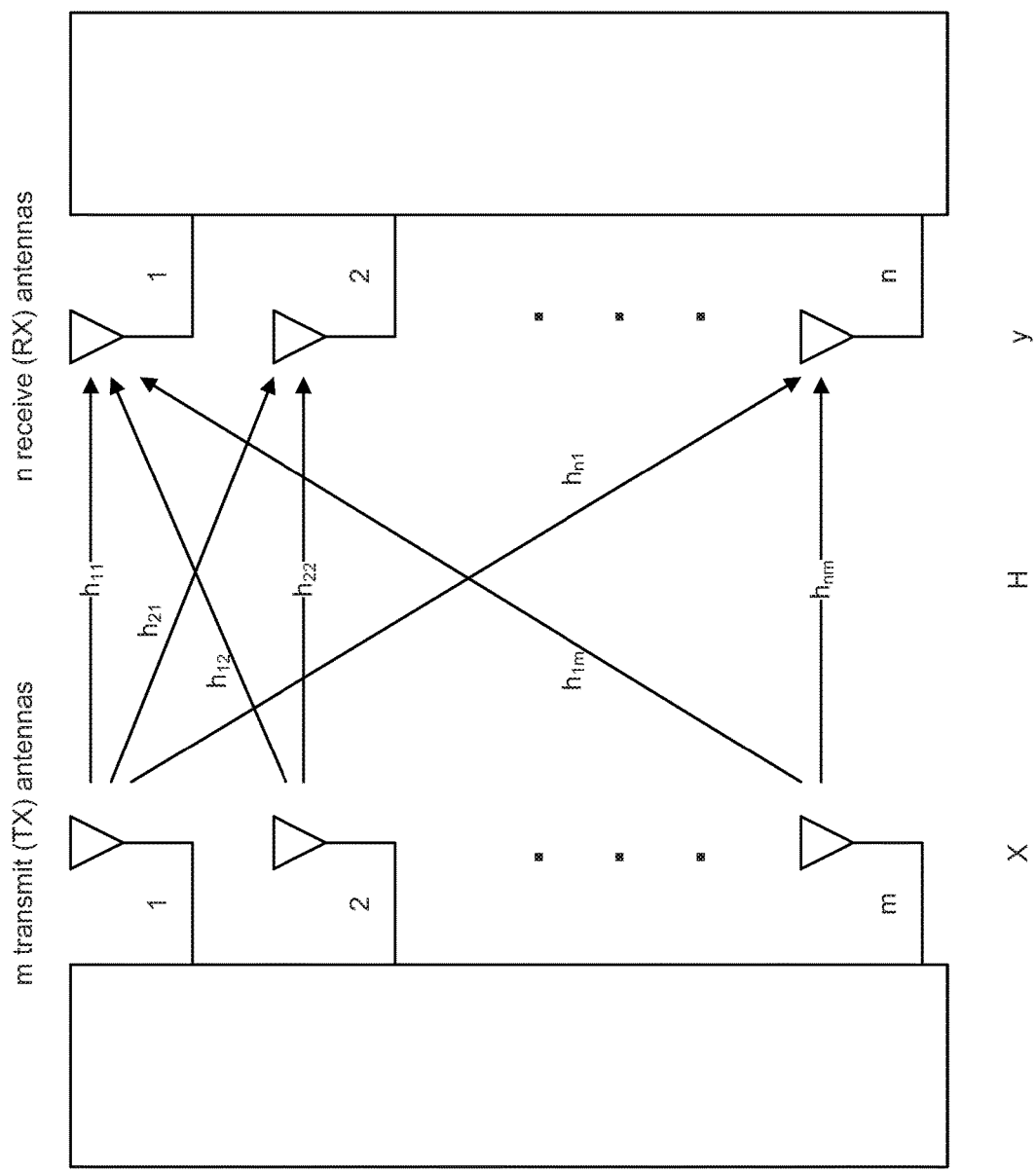
FIG. 4C illustrates a multiple input multiple output (MIMO) system with m transmit and n receive antennas.

FIG. 4C illustrates a multiple input multiple, output (MIMO) system with m transmit and n receive antennas. The MIMO system depicted in the figure represents one non-limiting embodiment of transmission (TX) and reception (RX) antennas that may be used in the systems depicted in FIGS. 4A and 4B. As illustrated, the MIMO system includes m TX antennas and n RX antennas. Accordingly, the receiver receives a signal y that results when the input signal vector x is multiplied by the transmission matrix H represented by the equation y=H*x, where $$H = \begin{bmatrix} h11 & \cdots & h1m \\ \vdots & \ddots & \vdots \\ hn1 & \cdots & hnm \end{bmatrix}$$

The transmission matrix H contains the channel impulse responses $h_{nm}$, which reference the channel between the TX antenna m and the RX antenna n. The rank of the channel matrix defines the number of linearly independent rows or columns in H, and indicates how many independent data streams (layers) can be transmitted simultaneously. To increase the data rate, spatial multiplexing may be employed. Using this technique, the data is divided into separate streams which are then transmitted simultaneously over the same resources. The transmission includes reference signals that are also known to the received, such that the receiver may perform a channel estimation for each transmit antenna's signal. The receiver may then report the channel status to the transmitter via a feedback channel to enable changes to be made as channel conditions change.

Figure 5A:
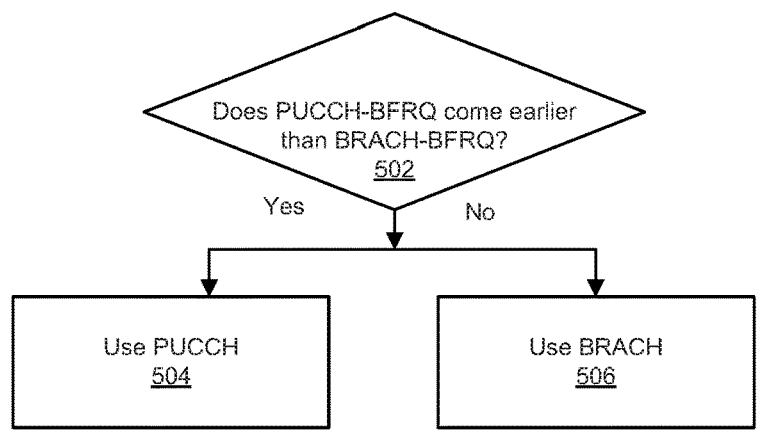
FIGS. 5A-5C illustrate a flow diagram for selection of a channel and examples of time of arrival for multiple beam failure recovery requests.
Figure 5B:
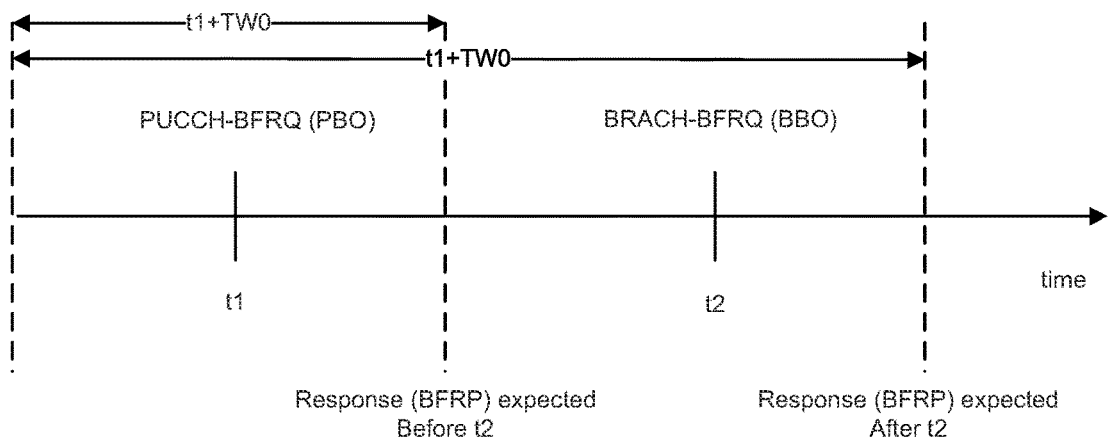

FIG. 5A illustrates a flow diagram for selecting a request channel, and FIG. 5B illustrates an example time of arrival of multiple beam failure recovery requests. As described in 3GPP R1-1709309, the following agreements on beam failure recovery (BFR) were reached.

To detect a beam failure, the UE (e.g., UE 404) monitors a reference signal (beam failure detection RS) to assess whether a beam failure trigger condition has been met (e.g., beam signal strength has dropped below a threshold). The beam failure detection RS includes, in one embodiment, a periodic CSI-RS for beam management, where an SS-block within the serving cell can be considered if the SS-block is also employed in beam management.

In order for the UE 404 to report detection of the beam failure, the UE 404 monitors the beam identification RS to find a new candidate beam. For example, the UE 404 monitors the periodic CSI-RS to detect beam failure when configured by the network, or the UE 404 monitors the periodic CSI-RS and SS-blocks within the serving cell when the SS-block is used to detect beam failure.

After the UE 404 detects the beam failure; a beam failure recovery request (BFRQ) transmission is performed. The BFRQ contains information that includes at least the following: explicit/implicit information that identifies the UE 404 and new gNB TX beam information, and explicit/implicit information that identifies the UE 404 and whether a new candidate beam exists. For example, the BFRQ may include a field that can be used by the gNB 402 to identify the UE 404 identity as well as the new identified beam (explicit manner). In another example, the BFRQ may include a preamble sequence that can be used by gNB 402 to identify the UE 404 identity as well as the new identified beam (implicit manner). In the latter case, UE 404 and gNB 402 need to agree on an association between the preamble sequence and the UE 404 identity/new identified beam. In one embodiment, the DL beam for transmitting the BFRQ may be one of PRACH, PUCCH or beam recovery random access channel. In one other embodiment, the BFRQ resource/signal may be used for a scheduling request.

The PRACH is an uplink channel used by the UE 404 for connection request purposes, and carries the RACH transport channel data, whereas the beam recovery random access channel is a PRACH-like structure in which different parameters for preamble sequences from PRACH are employed. In one other embodiment, the beam recovery random access channel may be the PRACH. Without loss of generality, in the following, we will use PRACH to represent beam recovery random access channel. The PUCCH is used to carry uplink control information (UCI) when the UE does not have any application data or radio resource control (RRC) signaling. The PUCCH controls signaling channel comprises HARQ ACK/NACK; CQI-channel quality indicators, MIMO feedback-RI (Rank Indicator), PMI (Precoding Matrix Indicator, scheduling requests for uplink transmission, and BPSK or QPSK used for PUCCH modulation.

After the BFRQ transmission has been performed, the UE 404 monitors a control channel search space to receive the gNB's 402 response (the BFRP) for the UE's BFRQ.

Based on the agreed upon beam failure request and recovery mechanisms discussed above, both the PRACH and PUCCH channels may be used in beam failure, recovery. For efficiency of communication, the UE 404 (or gNB 402) should determine which of the two channels to use when transmitting the BFRQ and the BFRP. In the example and non-limiting embodiments that follow, two scenarios are addressed; (1) the UE has previously used a PRACH to transmit a BFRQ, and a PUCCH resource arrives before a PRACH-BFRP, and (2) the UE has previously used a PUCCH to transmit a BFRQ, and a PRACH resource arrives before the PUCCH-BFRP.

With reference to FIG. 5A, the UE 404 determines whether to use the PUCCH or PRACH for sending/transmitting a BFRQ. For example, at 502, the UE 404 determines whether a PUCCH-BRFQ opportunity or a PRACH-BRFQ opportunity is expected to arrive first. If the UE 404 determines that a PUCCH-BRFQ opportunity will arrive first, then the UE 404 will use a PUCCH to send the BFRQ at 504. Otherwise, if the UE 404 determines that a PRACH-BFRQ opportunity will arrive first, then the UE 404 will use a PRACH to send the BFRQ at 506. PUCCH-BRFQ opportunity and PRACH-BRFQ opportunity are described below with reference to FIG. 5C and the examples that follow.

In general, it is appreciated that PUCCH is a less reliable channel compared to PRACH (which is more reliable as a result of its random access channel) as it remains subject to beam failure in the uplink direction. Accordingly, in one embodiment, PRACH should be in used when available in lieu of PUCCH, unless PUCCH can provide a faster resolution for beam failure recovery, as discussed below with reference to the various examples.

In the example of FIG. 5B, we assume for purposes of discussion that a PUCCH-BRFQ opportunity arrives at time t1, which is earlier than an expected PRACH-BFRQ OPPORTUNITY at time t2. When the PUCCH-BFRQ is made by the UE 404 at t1 the UE 404 monitors the channel for a PUCCH-BFRP within a response time window of (t1+TW0), where TW0 stands for the window duration. Typically, a time window may be specified by a time window starting position in time, and/or a time window ending position in time, and/or a time window duration in time. Note that the specification of the above message (starting position in time, and/or ending position in time, and/or time window duration in time) may be carried, from gNB 402 to UE 404, in a RRC message, or in a DCI message, or using a combination of the two. The starting position in time, in one embodiment, may be the same as the moment when the BFRQ is transmitted. Additionally, it is appreciated that the starting position in time, ending position in time, and/or time window duration may use units such as slots, mini-slots, milli-seconds, OFDM symbol periods Accordingly, if the UE 404 expects to receive a PUCCH-BRRP before the PRACH-BFRQ OPPORTUNITY at t2, the UE 404 performs the PUCCH-BFRQ at t1 Otherwise, the UE 404 does not perform the PUCCH-BRRQ at t1. Instead, the UE 404 will perform the PRACH-BFRQ at t2, even though t1 (PUCCH-BRFQ opportunity) is earner than t2 (PRACH-BFRQ OPPORTUNITY) and t1+TW0 is later than t2 (La, even if the response arrives after PRACH).

Figure 5C:
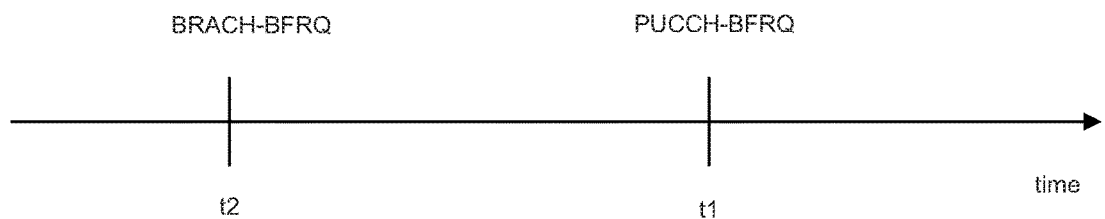

In the example of FIG. 5C, we assume for purposes of discussion that the PUCCH-BRFQ opportunity arrives at t1, which is after the PRACH-BFRQ OPPORTUNITY at t2. Under these circumstances, the PRACH-BFRQ OPPORTUNITY at t2 should be used to send the PRACH-BFRQ.

Figure 5D:
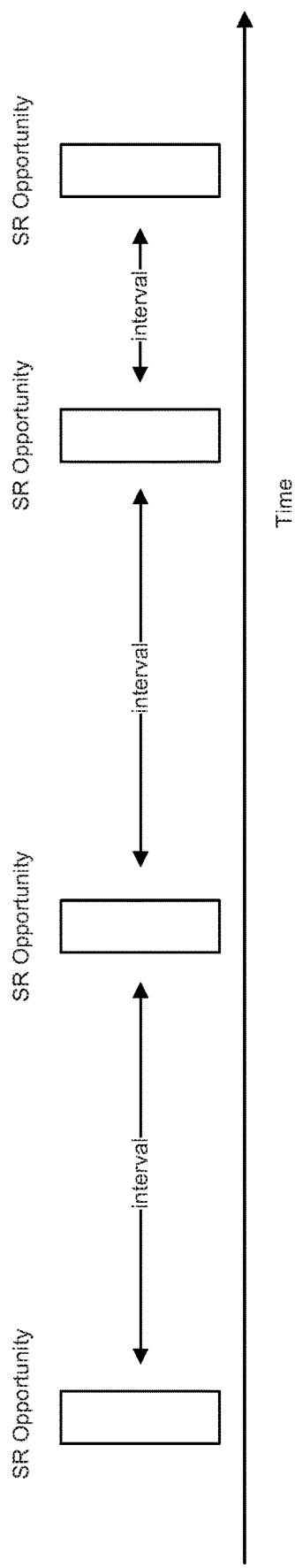
FIG. 5D is an example diagram illustrating scheduling request opportunities for user equipment to be configured.

FIG. 5D is an example diagram illustrating scheduling request opportunities for user equipment to be configured. The scheduling request opportunities are a precursor to understanding when opportunities to transmit PUCCH and PRACH transmissions become available. A scheduling request can be used by the UE 404 to request scheduling at a certain time frequency resource, so that the UE 404 can use the scheduled resource to carry out a certain communication task.

In cellular radio systems, the base station (e.g., gNB) signals (on the PDCCH) the time-frequency resources (physical resource blocks) that lie on the PDSCH and the PUSCH and which are allocated to a UE. This scheduling protocol allows advanced multi-antenna techniques like precoded transmission and MIMO operation for the DL shared data channel. For the case in which a UE has UL data to send, it will send a scheduling request (SR) to the gNB in order to obtain an UL grant for a PUSCH resource allocation.

There are two different ways in which a UE can send an SR. If the UE is not in an RRC connected state with the gNB it will use a random access, and if the UE is in an RRC connected state with the gNB it can use either the random access procedure or periodic SR resources. If periodic SR resources are configured, the UE will use one or more of the periodic SR resources on the PUCCH which are dedicated for that particular UE. Each of these dedicated SR resources may be considered an SR opportunity for the UE.

The interval of the UE's SR opportunities on the PUCCH is semi-statically fixed between 1 and 80 ms (milliseconds). In the figure, the UE is configured with a SR cycle which gives the interval between SR opportunities. Shorter intervals, and thus more frequent opportunities, are configured for UEs with delay critical services, while longer intervals were originally specified in order to allow conserving the PUCCH resources when the network is keeping a large number of UEs with relatively low activity levels in the RRC connected state. On the other hand, longer intervals between SR opportunities translate to longer delays when the UE needs to obtain PUSCH resources for delay critical signaling or data.

Figure 6A:
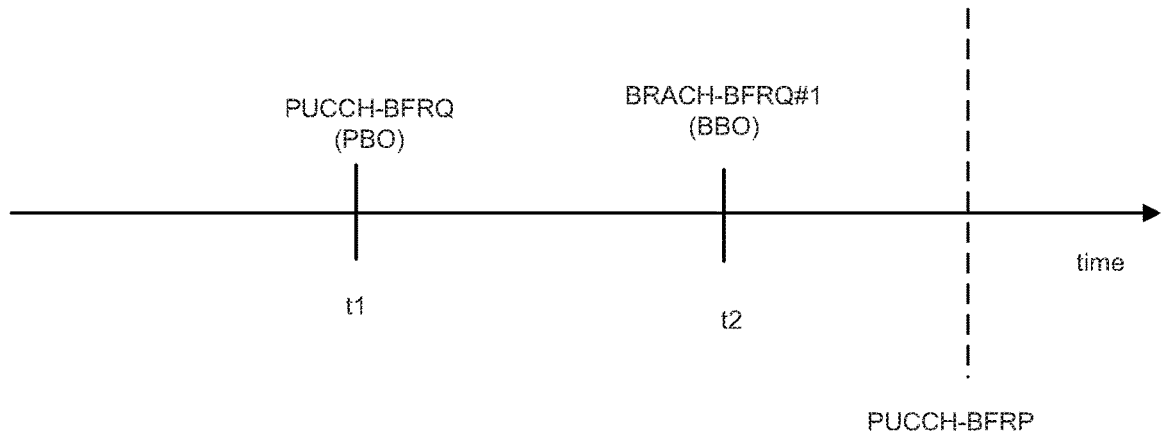
FIGS. 6A and 6B illustrate timing diagrams for sending multiple beam failure requests and responses.

FIG. 6A illustrates a timing diagram for sending multiple beam failure requests. Conventionally, more than one BFRQ for each BFR event is not permitted. That is, in conventional systems, the UE 404 does not send both a PUCCH-BFRQ and a PRACH-BFRQ for the same event.

In the depicted embodiment, more than one BFRQ (e.g., PUCCH-BFRQ, PRACH-BFRQ) is transmitted by a UE 404 for a single beam failure (BFR) event. Since more than one BFRQ may be transmitted by the UE 404, different channels (e.g., PUCCH and PRACH) may be used to send the BFRQ (and receive the BFRP). In order for the gNB 402 to transmit a BFRP in response to a respective BFRQ, the BFRQs should be associated with an event such that the gNB 402 can categorize each of the BFRQs and send back a response (BFRP) to the appropriate BFRQ without duplication. Accordingly, the gNB 402 should determine how to handle a response (BFRP) such that a single BFRP is sent back to the UE 404 from the gNB 402 per BFR event.

In one embodiment, the gNB 402 may implement an algorithm to determine whether multiple BFRQs (PRACH-BFRQ and PUCCH-BFRQ) correspond to the same event, such that the gNB 402 may provide a single response to the event. For example, if the multiple requests arrive within a certain time window, gNB 402 may view them corresponding to same event. In another embodiment, the UE 404 may signal (i.e., provide information) in the BFRQ that the PUCCH-BFRQ and the PRACH-BFRQ relate to the same event, as discussed in the examples depicted in FIGS. 6A and 63.

In the example of FIG. 6A, the PUCCH-BFRQ is sent followed by the PRACH-BFRQ. In particular, after a PUCCH-BFRQ is sent at t1, and before a PUCCH-BFRP arrives at the UE 404 from the gNB 402, the UE 404 has a PRACH-BFRQ OPPORTUNITY and sends a second BFRQ using a PRACH-BFRQ #1 (unlike the example in FIG. 5B in which only one of the BFRQs are sent, both BFRQs are sent in this example). Under these circumstances, the UE 404 notifies (as explained below) the gNB 402 that the second BFRQ (PRACH-BFRQ) shares the same BFR event as the first BFRQ (PUCCH-BFRQ), Notifying the gNB 402 that both BFRQs relate to the same event prevents the gNB 402 from misinterpreting the two BFRQs as being separate events for the same UE 404.

In one embodiment, the UE 404 may notify the gNB 402 by marking the second BFR event, when sending the BFRQ, as being second in time or order such the gNB 402 identifies the second BFRQ (PRACH-BFRQ) as not being a first request.

In another embodiment, the UE 404 may notify the gNB 402 by placing a pointer to the first BFRQ (PUCCH-BFRQ) in the second BFRQ (PRACH-BFRQ), which indicates that the PUCCH-BFRQ and the PRACH-BFRQ correspond to the same BFR event.

In still another embodiment, the UE 404 may notify the gNB 402 by placing a BFR event ID in both the first and second BFRQs (PUCCH-BFRQ and PRACH-BFRQ), such that all BFRQs with the same BFR event ID correspond to the same BFR event.

Figure 6B:
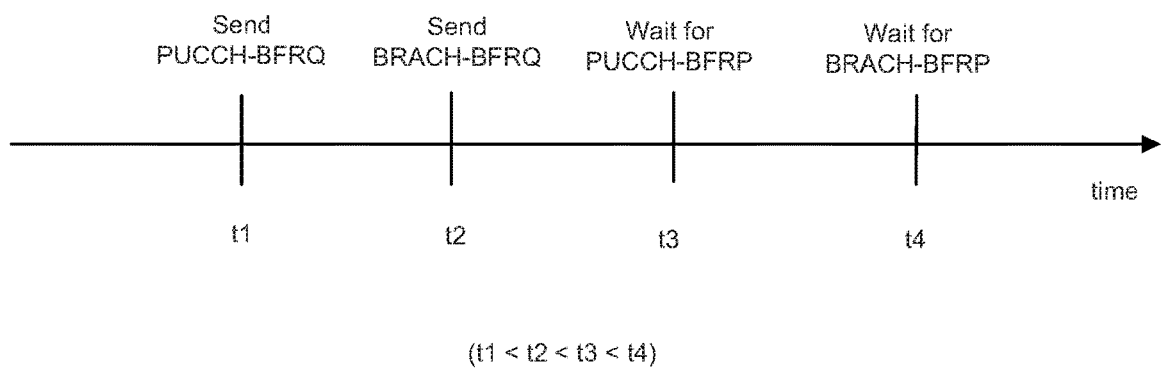

FIG. 6B illustrates a timing diagram for sending multiple beam failure responses. In the depicted example, the gNB 402 is due to send a PRACH-BFRP and a PUCCH-BFRP to a UE 404 in response to the UE's 404 multiple BFRQs.

Under circumstances where the gNB 402 is responding the UE's 404 multiple BFRQs, the gNB 402 sends a BFRP for each BFRQ (one corresponding to each channel). For example, the gNB 402 may send a PUCCH-BFRP in response to the PUCCH-BFRQ by the UE 404, and send a PRACH-BFRP in response to the PRACH-BFRQ by the UE 404. Similar to the UE 404 notifying the gNB 402 of the same BFR event, the gNB may associate the two BFRPs (PUCCH-BFRP and PRACH-BFRP) such that the UE 404 can identify the two BFRPs as corresponding to the same event.

In one embodiment, the gNB 402 marks the second BFRP as second in time or order. In another embodiment, the gNB 402 places a pointer to the first BFRP in the second BFRP. In still another embodiment, the gNB 402 places a BFR event ID in both BFRPs such that the UE 404 identifies the two BFRPs as corresponding to the same event.

It is appreciated in the examples above that the UE 404 may first send a PRACH-BFRQ, followed by a PUCCH-BFRQ, and that the disclosure is no limited to the depicted embodiment.

In still another embodiment, the gNB 402 may be set to respond to a single BFR Q using, for example, an algorithm. For example, the gNB 402 may respond to the BFRQ by (1) always sending the PRACH-BFRP, (2) always sending the PUCCH-BFRP, (3) always sending the BFRP that arrives first, or (4) sending a BFRP at the location of another BFRP.

As illustrated in the example of FIG. 6B, a single BFRP is sent in response to two BFRQs. In the example, the UE 404 sends two BFRQs—a PUCCH-BFRQ at time t1 and a PRACH-BFRQ at time t2. The UE 404 then wafts for a single BFRP—a PUCCH-BFRP at time t3 or a PRACH-BFRP at t4, from the gNB 402.

The gNB 402 responds to the UE's 404 two BFRQs based on the afore-mentioned algorithm. For example, the UE 404 sends a PUCCH-BFRQ at t1 and a PRACH-BFRQ at t2. The UE 404 then waits for a PUCCH-BFRP at t3 and a PRACH-BFRP at t4. In response, the gNB sends out a single BFRP as follows: the gNB sends out a PRACH-BFRP at time t4 (response always the PRACH-BFRP), the gNB sends out a PUCCH-BFRP at time t3 (response always the PUCCH-BFRP), the gNB sends out a PUCCH-BFRP at time t3 (response always the BFRP that comes first), and the gNB sends out a PRACH-BFRP at time t3 (a BFRP at the location of another BFRP).

Figure 7A:
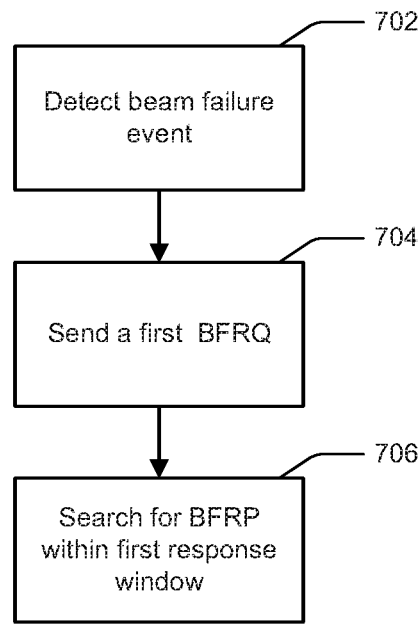
FIGS. 7A and 7B illustrate flow diagrams in accordance with the disclosed embodiments.
Figure 7B:
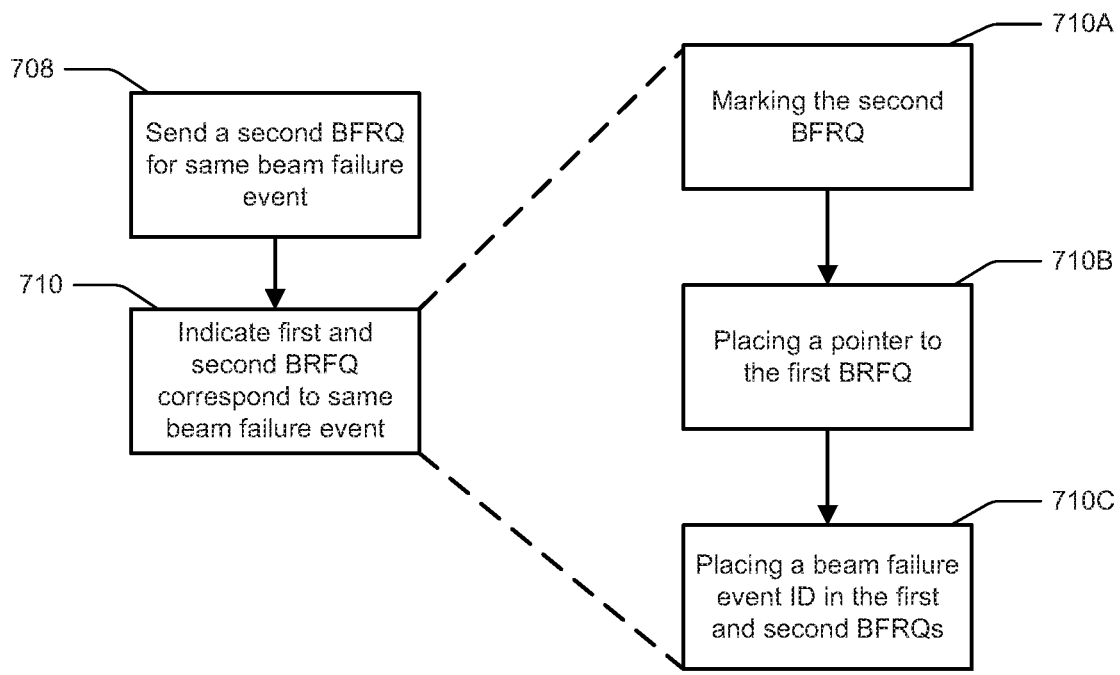

FIGS. 7A and 7B illustrate flow diagrams in accordance with the disclosed embodiments. In the embodiments described herein, the processes are implemented by the user equipment. However, it is appreciated that any of the system components, such as the base station or any component described in FIGS. 1, 2, 4C, 8A, 8B and/or 9, may be employed to implement the processes.

With reference to FIG. 7A, user equipment (e.g., UE 110) detects a beam failure event between the UE 110 and the base station (e.g., gNB 202) at 702. A beam failure event may be defined, for example, as a beam failure occurring between the UE 110 and gNB 202 (i.e., when a communication link established between the UE and gNB fans, for example, due to misalignment). At 604, and in response to detecting the beam failure event, the UE 110 sends a first beam failure recovery request (BFRQ) (i.e., a request from the UE 110 to reestablish communication with the gNB 202) to the gBN 202 and then searches for a beam failure recovery response (BFRP) (i.e., a response from the gNB 202 to begin reestablishing the beam with the UE 110) within a first response time window at 706. In one embodiment, the first BFRQ is sent using one of a PUCCH and a PRACH for beam failure recovery. In one other embodiment, the first response window is a PUCCH response window when the BFRQ is sent using the PUCCH, and the first response window is a beam failure random access channel (PRACH) response window when the BFRQ is sent using the PRACH for beam failure recovery.

Turning to FIG. 7B, at 708 the UE 110 sends a second BFRQ form the UE 110 to the gNB 202 for a same beam failure event which indicates, at 710, that the first and second BFRQ correspond to the same beam failure event. Moreover, the indication may include one of marking the second BFRQ as secondary in time or order (710A), placing a pointer in the second BFRQ indicating that the first and second BFRQs correspond to the same beam failure event (710B), and placing a beam failure event ID in the first BFRQ and the second BFRQ with the same beam failure event ID (710C). In still one other embodiment (not illustrated), the first and second BFRPs received from the base station may include a mark in the second BFRP as secondary as secondary in time or order, a pointer in the second BFRP to the first BFRP indicating that the first and second BFRPs correspond to the same beam failure event, and a beam failure event ID in the first and second BFRPs with the same beam failure event ID.

Figure 8A:
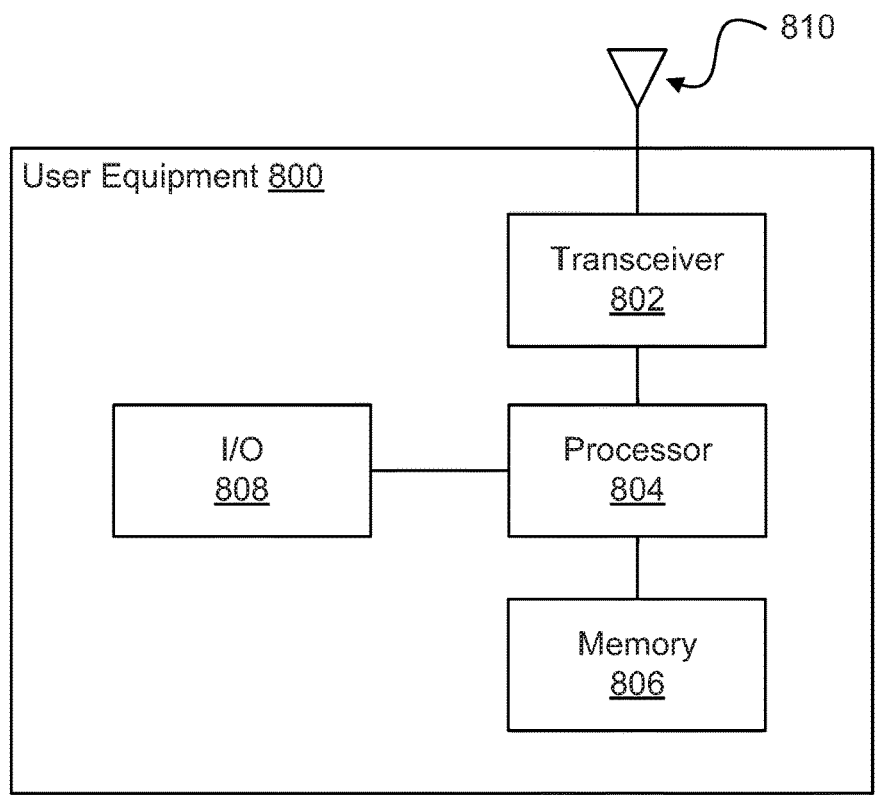
FIG. 8A illustrates example user equipment that may implement the methods and teachings according to this disclosure.

FIG. 8A illustrates example user equipment that may implement the methods and teachings according to this disclosure. As shown in the figure, the UE 800 includes at least one processor 804. The processor 804 implements various processing operations of the UE 800. For example, the processor 804 may perform signal coding, data processing, power control, input/output processing, or any other functionality enabling the UE 800 to operate in the system 100 (FIG. 1). The processor 804 may include any suitable processing or computing device configured to perform one or more operations. For example, the processor 804 may include a microprocessor, microcontroller, digital signal processor, field programmable gate array, or application specific integrated circuit.

The UE 800 also includes at least one transceiver 802. The transceiver 802 is configured to modulate data or other content for transmission by at least one antenna 810. The transceiver 802 is also configured to demodulate data or other content received by the at least one antenna 810. Each transceiver 802 may include any suitable structure for generating signals for wireless transmission and/or processing signals received wirelessly. Each antenna 810 includes any suitable structure for transmitting and/or receiving wireless signals. It is appreciated that one or multiple transceivers 802 could be used in the UE 800, and one or multiple antennas 810 could be used in the UE 800. Although shown as a single functional unit, a transceiver 802 may also be implemented using at least one transmitter and at least one separate receiver.

The UE 800 further includes one or more input/output devices 808. The input/output devices 808 facilitate interaction with a user. Each input/output device 808 includes any suitable structure for providing information to or receiving information from a user, such as a speaker, microphone, keypad, keyboard, display, or touch screen.

In addition, the UE 800 includes at least one memory 806. The memory 806 stores instructions and data used, generated, or collected by the UE 700. For example, the memory 806 could store software or firmware instructions executed by the processor(s) 804 and data used to reduce or eliminate interference in incoming signals. Each memory 806 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

Figure 8B:
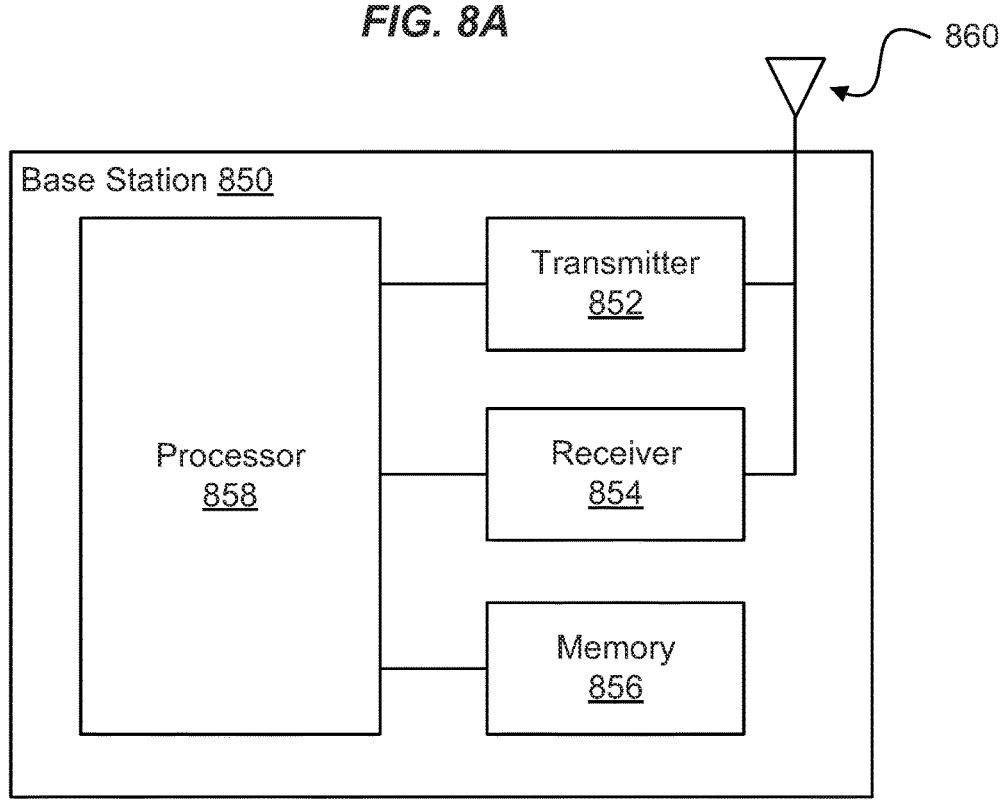
FIG. 8B illustrates example base station that may implement the methods and teachings according to this disclosure.

FIG. 8B illustrates example base station that may implement the methods and teachings according to this disclosure. As shown in the figure, the base station 850 includes at least one processor 858, at least one transmitter 852 at least one receiver 854, one or more antennas 860, and at least one memory 856. The processor 858 implements various processing operations of the base station 850, such as signal coding, data processing, power control, input/output processing, or any other functionality. Each processor 858 includes any suitable processing or computing device configured to perform one or more operations. Each processor 858 could, for example, include a microprocessor, microcontroller, digital signal processor, field programmable gate array, or application specific integrated circuit.

Each transmitter 852 includes any suitable structure for generating signals for wireless transmission to one or more UEs or other devices. Each receiver 854 includes any suitable structure for processing signals received wirelessly from one or more UEs or other devices. Although shown as separate components, at least one transmitter 852 and at least one receiver 854 could be combined into a transceiver. Each antenna 860 includes any suitable structure for transmitting and/or receiving wireless signals. While a common antenna 860 is shown here as being coupled to both the transmitter 852 and the receiver 854, one or more antennas 860 could be coupled to the transmitter(s) 852, and one or more separate antennas 860 could be coupled to the receiver(s) 854. Each memory 856 includes any suitable volatile and/or non-volatile storage and retrieval device(s).

Figure 9:
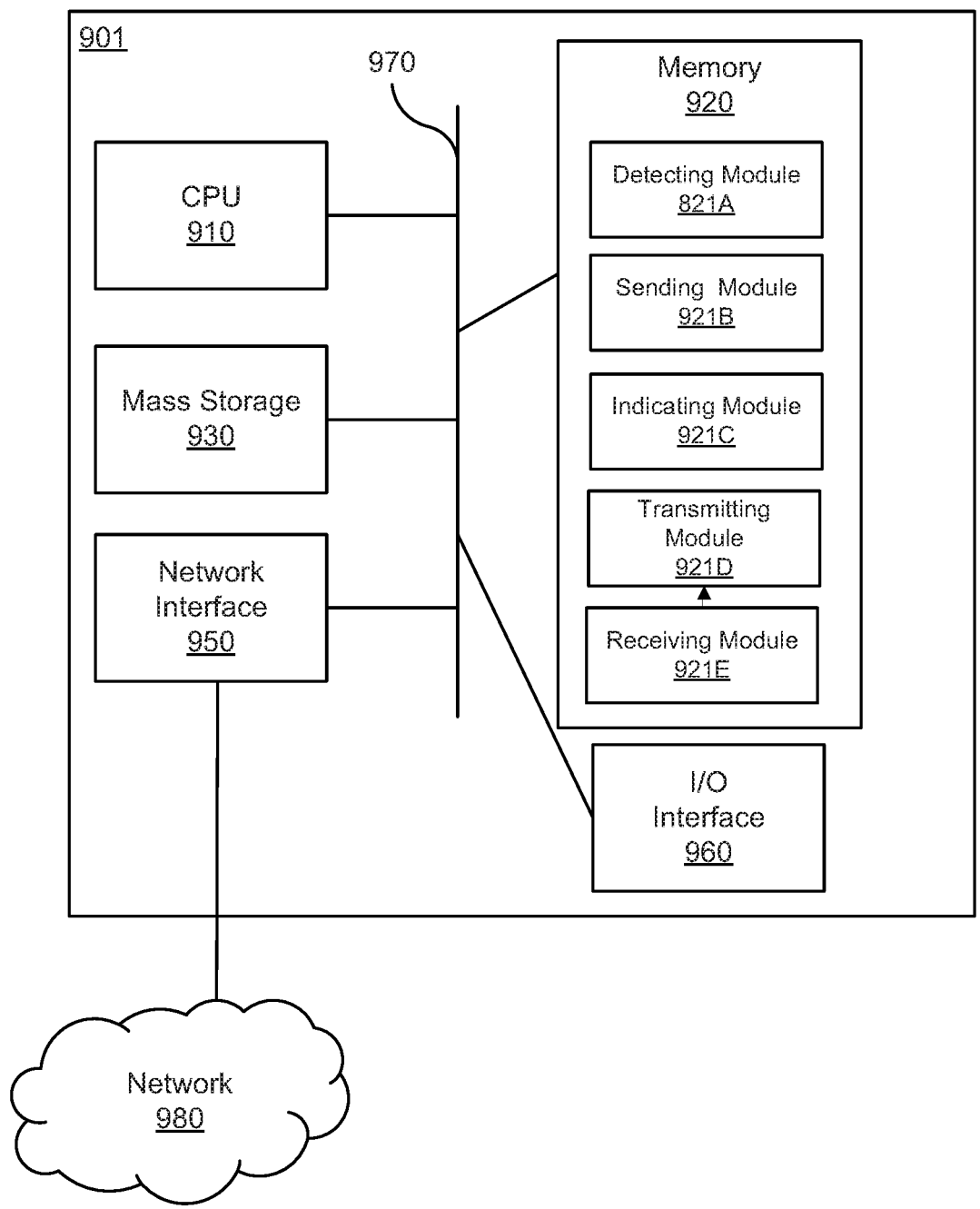
FIG. 9 is a block diagram of a network device that can be used to implement various embodiments.

FIG. 9 is a block diagram of a network device that can be used to implement various embodiments. Specific network devices may utilize all of the components shown, or only a subset of the components, and levels of integration may vary from device to device. Furthermore, the network device 900 may contain multiple instances of a component, such as multiple processing units, processors, memories, transmitters, receivers, etc. The network device 900 may comprise a processing unit 901 equipped with one or more input/output devices, such as network interfaces, storage interfaces, and the like. The processing unit 901 may include a central processing unit (CPU) 910, a memory 920, a mass storage device 930, and an I/O interface 960 connected to a bus 970. The bus 970 may be one or more of any type of several bus architectures including a memory bus or memory controller, a peripheral bus or the like.

The CPU 910 may comprise any type of electronic data processor. The memory 920 may comprise any type of system memory such as static random access memory (SRAM), dynamic random access memory (DRAM), synchronous DRAM (SDRAM), read-only memory (ROM), a combination thereof, or the like. In an embodiment, the memory 820 may include ROM for use at boot-up, and DRAM for program and data storage for use while executing programs. In embodiments, the memory 920 is non-transitory. In one embodiment, the memory 920 includes a detecting module 921A detecting a beam failure event between the user equipment and a base station, a sending module 921B sending a first beam failure recovery request (BFRQ) to the base station upon detection of the beam failure, wherein the first BFRQ is sent using one of a physical uplink channel (PUCCH) and a beam failure random access channel (PRACH), an indicating module 921C indicating to the base station that the first and second BFRQs correspond to the same beam failure event, a transmitting module 921D transmitting a beam, and a receiving module 921E receiving a beam.

The mass storage device 930 may comprise any type of storage device configured to store data, programs, and other information and to make the data, programs, and other information accessible via the bus 970. The mass storage device 930 may comprise, for example, one or more of a solid state drive, hard disk drive, a magnetic disk drive, an optical disk drive, or the like.

The processing unit 901 also includes one or more network interfaces 950, which may comprise wired links, such as an Ethernet cable or the like, and/or wireless links to access nodes or one or more networks 980. The network interface 950 allows the processing unit 901 to communicate with remote units via the networks 980. For example, the network interface 950 may provide wireless communication via one or more transmitters/transmit antennas and one or more receivers/receive antennas. In an embodiment, the processing unit 901 is coupled to a local-area network or a wide-area network for data processing and communications with remote devices, such as other processing units, the Internet, remote storage facilities, or the like.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The computer-readable non-transitory media includes all types of computer readable media, including magnetic storage media, optical storage media, and solid state storage media and specifically excludes signals. It should be understood that the software can be installed in and sold with the device. Alternatively the software can be obtained and loaded into the device, including obtaining the software via a disc medium or from any manner of network or distribution system, including, for example, from a server owned by the software creator or from a server not owned but used by the software creator. The software can be stored on a server for distribution over the Internet, for example.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for beam failure recovery in an user equipment, comprising:
    detecting a beam failure event between the user equipment and a base station;
    sending a first beam failure recovery request (BFRQ) to the base station upon detection of the beam failure event;
    searching for a beam failure recovery response (BFRP) within a first response time window;
    sending a second BFRQ to the base station, during the first response time window, the second BFRQ indicating that the second BFRQ corresponds to a same beam failure event as the first BFRQ, wherein the indicating includes one of:
        marking the second BFRQ as secondary in time or order,
        placing a pointer to the first BFRQ in the second BFRQ indicating that the first and second BFRQs correspond to the same beam failure event, and
        placing a beam failure event ID in the first BFRQ and the second BFRQ with the same beam failure event ID.

2. The method of claim 1, wherein sending the BFRQ is carried out in the physical layer of the user equipment.

3. The method of claim 1, wherein the first BFRQ is sent using one of a physical uplink channel (PUCCH) or a beam failure random access channel (PRACH) for beam failure recovery.

4. The method of claim 1, wherein the first response time window is a PUCCH response window when the BFRQ is sent using the PUCCH, and the first response time window is a beam failure random access channel (PRACH) response window when the BFRQ is sent using the PRACH for beam failure recovery.

5. The method of claim 1, wherein a parameter of the first response time window includes at least one of a response window starting position in time, a response window ending position in time or a response window duration in time.

6. The method of claim 5, wherein the parameter of the first response time window is either signaled to the user equipment in at least one of a radio resource control (RRC) message or a downlink control information (DCI) message.

7. The method of claim 3, wherein the first BFRQ is sent using the PUCCH when a PUCCH-BFRQ opportunity arrives before a PRACH-BFRQ opportunity.

8. The method of claim 3, wherein the first BFRQ is sent using the PUCCH when a PUCCH-BFRQ opportunity arrives after a PRACH-BFRQ opportunity.

9. The method of claim 3, wherein
the PUCCH-BFRQ arrives at a first time and the PRACH-BFRQ arrives at a second time, and
the PUCCH-BFRQ is sent at the first time when a PUCCH-BFRQ opportunity response is expected before a PRACH-BFRQ opportunity at the second time, unless a sum of the first time and a response time exceeds the second time.

10. The method of claim 1, further comprising:
receiving first and second beam failure recovery responses (BFRPs) from the base station, wherein the BFRP includes one of:
a mark in the second BFRP as secondary as secondary in time or order,
a pointer in the second BFRP to the first BFRP indicating that the first and second BFRPs correspond to the same beam failure event, and
a beam failure event identifier (ID) in the first and second BFRPs with the same beam failure event ID.

11. The method of claim 1, wherein the second BFRQ is on a different channel than or carrier frequency than the first BFRQ.

12. A device for beam failure recovery in an user equipment, comprising:
a non-transitory memory storage comprising instructions; and
one or more processors in communication with the memory, wherein the one or more processors execute the instructions to:
detect a beam failure event between the user equipment and a base station;
send a first beam failure recovery request (BFRQ) to the base station upon detection of the beam failure event;
search for a beam failure recovery response (BFRP) within a first response time window; and
send a second BFRQ to the base station, during the first response time window, the second BFRQ indicating that the second BFRQ corresponds to a same beam failure event as the first BFRQ, wherein the indicating includes one of:
marking the second BFRQ as secondary in time or order,
placing a pointer to the first BFRQ in the second BFRQ indicating that the first and second BFRQs correspond to the same beam failure event, and
placing a beam failure event ID in the first BFRQ and the second BFRQ with the same beam failure event ID.

13. The device of claim 12, wherein sending the BFRQ is carried out by physical layer functions of and is based on higher layer instructions of the user equipment.

14. The device of claim 12, wherein the first BFRQ is sent using one of a physical uplink channel (PUCCH) or a beam failure random access channel (PRACH) for beam failure recovery.

15. The device of claim 12, wherein the first response time window is a PUCCH response window when the BFRQ is sent using the PUCCH, and the first response time window is a beam failure random access channel (PRACH) response window when the BFRQ is sent using the PRACH for beam failure recovery.

16. The device of claim 12, wherein parameter of the first response time window includes at least one of a response window starting position in time, a response window ending position in time or a response window duration in time.

17. The device of claim 16, wherein the parameter of the first response time window is either signaled to the user equipment in at least one of a radio resource control (RRC) message or a downlink control information (DCI) message.

18. The device of claim 14, wherein the first BFRQ is sent using the PUCCH when a PUCCH-BFRQ opportunity arrives before a PRACH-BFRQ opportunity.

19. The device of claim 14, wherein the first BFRQ is sent using the PUCCH when a PUCCH-BFRQ opportunity arrives after a PRACH-BFRQ opportunity.

20. The device of claim 14, wherein
the PUCCH-BFRQ arrives at a first time and the PRACH-BFRQ arrives at a second time, and
the PUCCH-BFRQ is sent at the first time when a PUCCH-BFRQ opportunity response is expected before a PRACH-BFRQ opportunity at the second time, unless a sum of the first time and a response time exceeds the second time.

21. The device of claim 20, further comprising:
receiving first and second beam failure recovery responses (BFRPs) from the base station, wherein the BFRP includes one of:
a mark in the second BFRP as secondary as secondary in time or order,
a pointer in the second BFRP to the first BFRP indicating that the first and second BFRPs correspond to the same beam failure event, and
a beam failure event identifier (ID) in the first and second BFRPs with the same beam failure event ID.

22. The device of claim 20, wherein the second BFRQ is on a different channel than the first BFRQ.

23. A non-transitory computer-readable medium storing computer instructions for beam failure recovery in an user equipment that when executed by one or more processors, cause the one or more processors to perform the operations of:
detecting a beam failure event between the user equipment and a base station;
sending a first beam failure recovery request (BFRQ) to the base station upon detection of the beam failure event;
searching for a beam failure recovery response (BFRP) within a first response window; and
sending a second BFRQ to the base station, during the first response time window, the second BRFQ indicating that the second BFRQ corresponds to a same beam failure event as the first BFRQ, wherein the indicating includes one of:
marking the second BFRQ as secondary in time or order,
placing a pointer to the first BFRQ in the second BFRQ indicating that the first and second BFRQs correspond to the same beam failure event, and
placing a beam failure event ID in the first BFRQ and the second BFRQ with the same beam failure event ID.

24. The non-transitory computer-readable medium of claim 23, wherein the first BFRQ is sent using one of a physical uplink channel (PUCCH) or a beam failure random access channel (PRACH) for beam failure recovery.

25. The non-transitory computer-readable medium of claim 23, wherein the first response time window is a PUCCH response window when the BFRQ is sent using the PUCCH, and the first time response window is a beam failure random access channel (PRACH) response window when the BFRQ is sent using the PRACH for beam failure recovery.

\* \* \* \* \*